US006613226B2

United States Patent
Kuo

(10) Patent No.: US 6,613,226 B2
(45) Date of Patent: Sep. 2, 2003

(54) LAMINATED MODULAR WATER FILTER

(75) Inventor: Joseph Kuo, Taichung (TW)

(73) Assignee: Kintech Technology Co., Ltd., Taichung (TW)

( * ) Notice: Subject to any disclaimer, the term of this patent is extended or adjusted under 35 U.S.C. 154(b) by 41 days.

(21) Appl. No.: 10/000,539

(22) Filed: Oct. 19, 2001

(65) Prior Publication Data
US 2003/0034287 A1 Feb. 20, 2003

(51) Int. Cl.⁷ .............................................. B01D 25/164
(52) U.S. Cl. ...................... 210/225; 210/227; 210/231; 210/333.01; 210/347; 210/486
(58) Field of Search .............................. 210/224, 225, 210/226, 227, 228, 229, 231, 321.75, 333.01, 346, 347, 456, 486, 487, 492

(56) References Cited

U.S. PATENT DOCUMENTS 4,695,380 A * 9/1987 Hilgendorff et al. ........ 210/347
5,536,405 A * 7/1996 Myrna et al. .......... 210/321.75

* cited by examiner

Primary Examiner—Matthew O. Savage
(74) Attorney, Agent, or Firm—Christensen O'Connor; Johnson Kindness PLLC

(57) ABSTRACT

A laminated modular water filter includes a top plate, a bottom plate and a plurality of superposed intermediate plates disposed between the top and bottom plates. Each adjacent pair of the top, intermediate and bottom plates are interconnected removably, and define an accommodating space therebetween, within which a filter unit is received fittingly. Each of the top and bottom plates has a central hole which is in fluid communication with central holes in the intermediate plates, and two side openings which are in fluid communication with a plurality of annular outer passages units in the intermediate plates that are in fluid communication with the accommodating spaces. Each of the filter units includes two filter films interconnected fixedly along outer peripheries thereof, and a filter net disposed between the films so as to define an annular filtered-water passage between the films that is fluid communication with the central holes.

3 Claims, 11 Drawing Sheets

LAMINATED MODULAR WATER FILTER

BACKGROUND OF THE INVENTION

1. Field of the Invention

This invention relates to a water filter, and more particularly to a laminated modular water filter.

2. Description of the Related Art

Referring to FIG. 1, a spiral-wound-type first conventional water filer 1 is shown to include a filter film unit 103, which is disposed between a pair of supporting nets 104 that are wound fixedly on a porous inner pipe 105. An outer pipe 106 is disposed fixedly around the inner pipe 105, and has two ends that are provided with two fixed end caps 107, respectively. Although the filter 1 can filter water effectively, it cannot be cleaned by forcing water therethrough. Furthermore, because it is difficult to remove the film unit 103 from the inner and outerpipes 105, 106, the former can only be cleaned by chemical agents after the filter 1 has been in use for a long time, thereby resulting in an expensive film-cleaning process.

Referring to FIGS. 2 and 3, a tubular-type second conventional water filter 2 is shown to include a plurality of tubular filter films 201 that are disposed within a pipe 202, thereby defining a filtered-water passage 203 between the pipe 202 and the films 201. Right and left outlets 204, 205 are formed respectively in two end portions of the pipe 202, and are in fluid communication with the passage 203. The pipe 202 has a left end chamber 206 that is in fluid communication with the left ends of the films 201, and a right end chamber 206' that is in fluid communication with the right ends of the films 201. When it is desired to filter raw water or sewage water, that is referred to as dirty water hereinafter, one of the end chambers 206, 206' is closed, e.g. by means of a stop valve (not shown), and the dirty water is forced into the other one of the end chambers 206, 206', e.g. by a pump (not shown). The dirty water seeps through the films 201 so as to flow into the passage 203, thereby forming filtered potable water, which flows from the filter 2 through the outlets 204, 205. When it is desired to clean the filter 2, the outlets 204, 205 are closed and the end chambers 206, 206' are opened so that washing water can be forced into one of the end chambers 206, 206' so as to flow through the water filter 2 and exit the other one of the end chambers 206, 206'. Although the water filter 2 can be cleaned effectively, when the sizes of the solid particles suspended in the dirty water to be processed are comparatively large, they are easily stuck within the films 201, thereby affecting adversely the filtering effect of the water filter 2.

FIG. 4 shows a capillary-tube type third conventional water filter 3, which is similar to the second conventional water filter 2 (see FIGS. 2 and 3) and which includes a plurality of tubular filter films 301 that are filled within a pipe 302. The third conventional water filter 3 has the same drawback as the second conventional water filter 2 (see FIGS. 2 and 3).

SUMMARY OF THE INVENTION

An object of this invention is to provide a laminated modular water filter with a plurality of filter units, the number of which can be increased when the dirty water to be filtered is comparatively dirty.

Anther object of this invention is to provide a laminated modular water filter with a plurality of filter units, which can be cleaned effectively by forcing water through the filter units in opposite directions.

Still another object of this invention is to provide a laminated modular water filter with a plurality of filter units, which can be easily dismounted for cleaning purposes.

According to this invention, a laminated modular water filter includes a top plate, a bottom plate and a plurality of superposed intermediate plates disposed between the top and bottom plates. Each adjacent pair of the top, intermediate and bottom plates are interconnected removably, and define an accommodating space therebetween, within which a filter unit is received fittingly. Each of the top and bottom plates has a central hole which is in fluid communication with central holes in the intermediate plates, and two side openings which are in fluid communication with annular outer passages units in the intermediate plates that are in fluid communication with the accommodating spaces. Each of the filter units includes two filter films interconnected along outer peripheries thereof, and a filter net disposed between the films so as to define a filtered-water passage between the films that is fluid communication with the central holes.

When it is desired to filter dirty water, the central hole and the openings in the bottom plate are closed, and the dirty water is forced into the openings in the top plate. The dirty water flows into the outer passage units in the intermediate plates and subsequently into the accommodating spaces so as to seep through the films, thereby forming filtered water in the filtered-water passages, which flows from the water filter through the central hole in the top plate.

When the water to be processed is comparatively dirty, the number of the intermediate plates and the filter units can be increased.

The water filter can be cleaned by:

(1) a forward washing method including the steps of closing the central holes in the top and bottom plates, and forcing washing water into the openings in the top plate so as to flow from the water filter through the openings in the bottom plate; or (2) a reverse washing method including the steps of closing the central hole in the top plate, and forcing washing water into the central hole in the bottom plate so as to flow from the water filter through the openings in the top and bottom plates; or (3) a dismount washing method including the steps of removing each of the filter units from the remaining parts of the water filter and washing the former.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
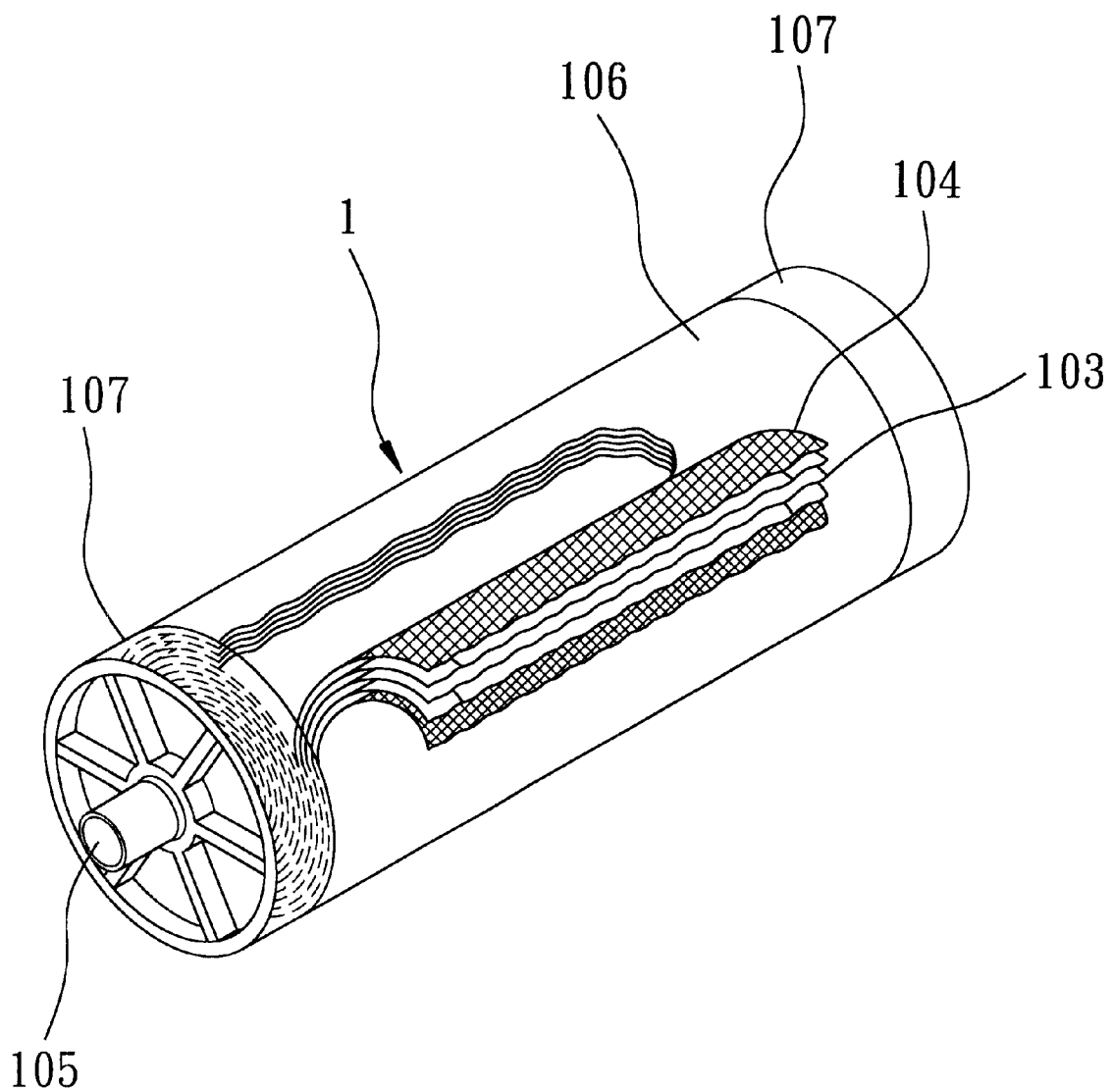
FIG. 1 is a partly sectioned perspective view of a first conventional water filter, in which a filter film unit and two supporting nets are stretched partially for the sake of illustration.
Figure 2:
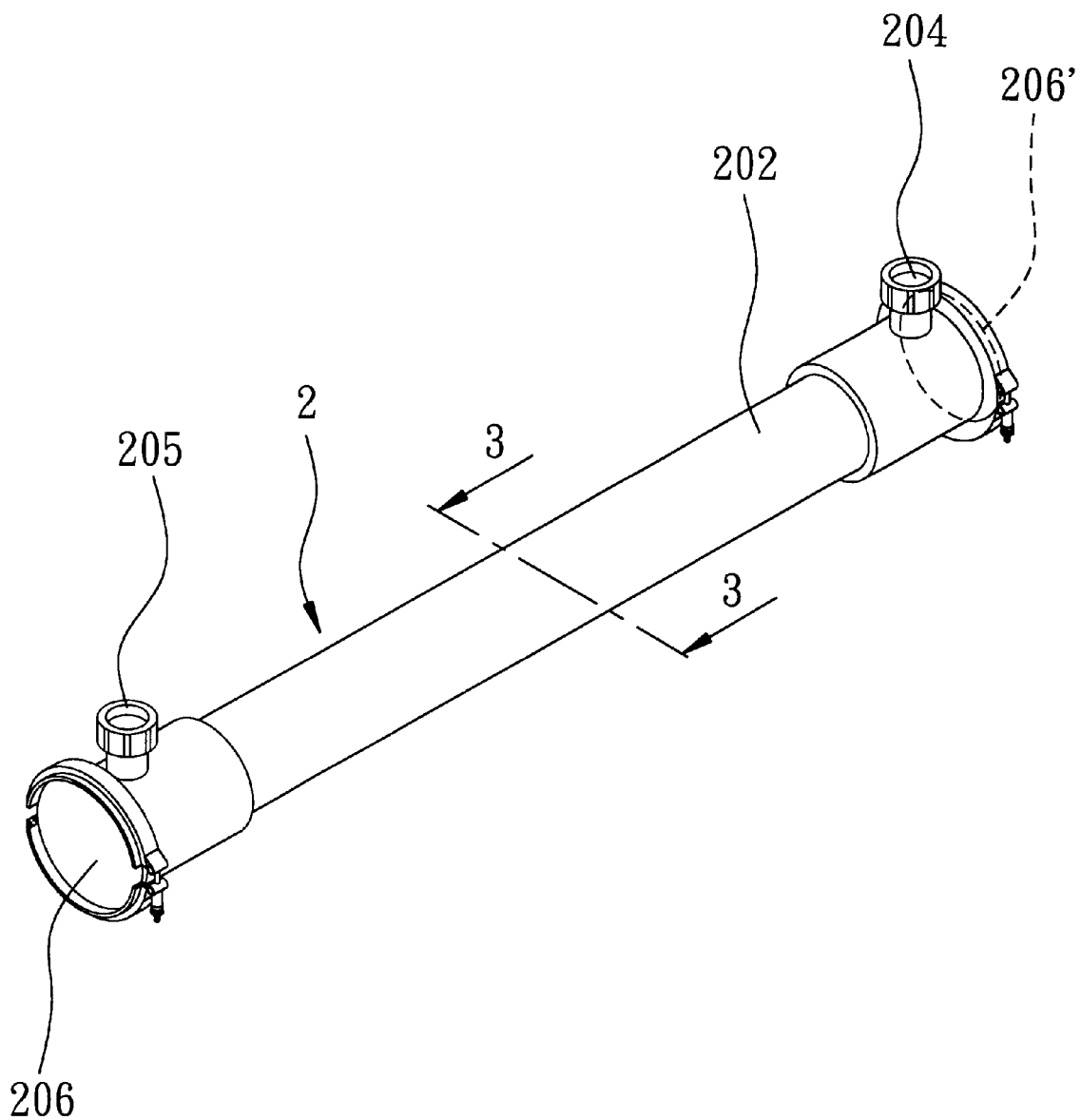
FIG. 2 is a perspective view of a second conventional water filter.
Figure 3:
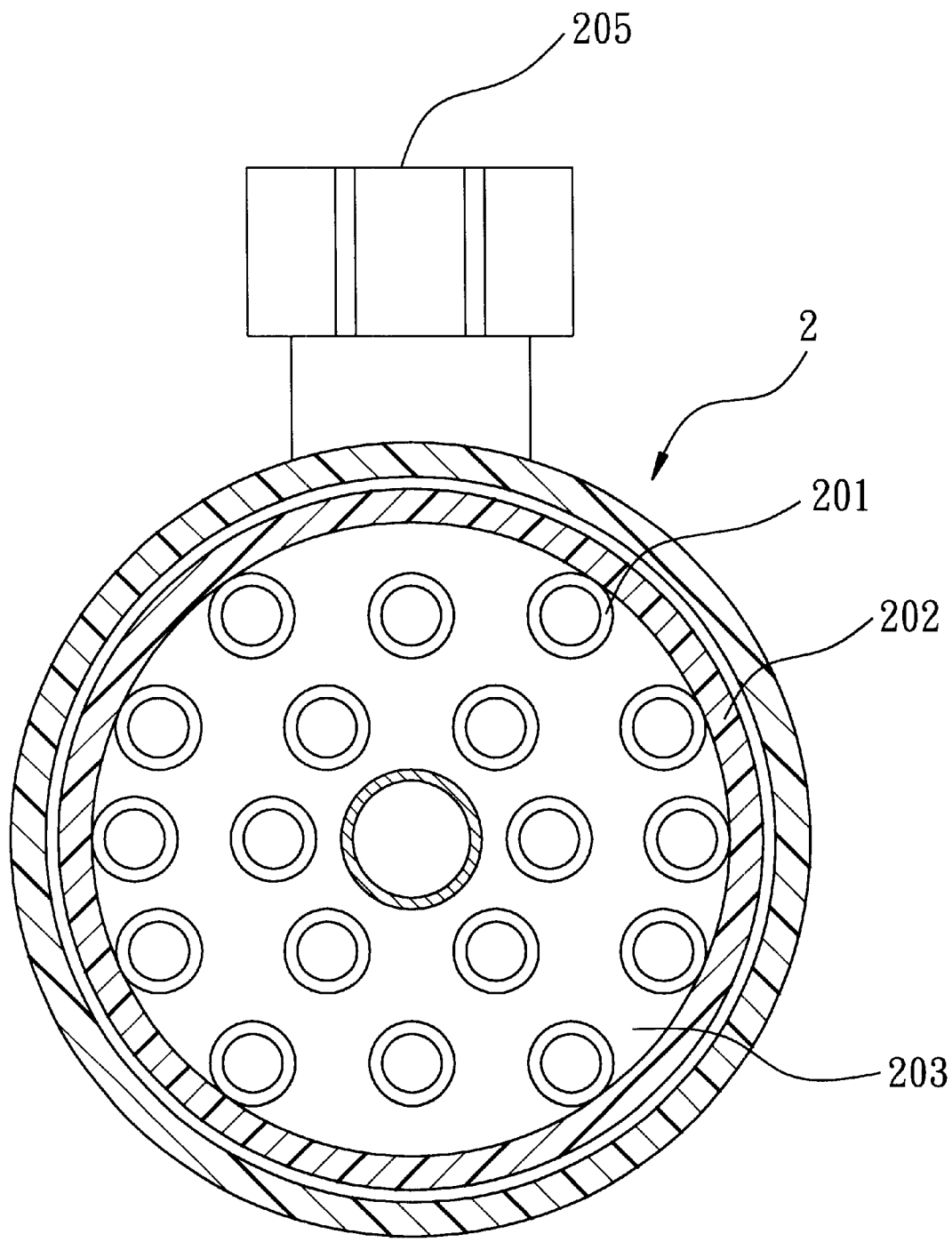
FIG. 3 is a sectional view of the second conventional water filter, taken along Line 3—3 in FIG. 2.
Figure 4:
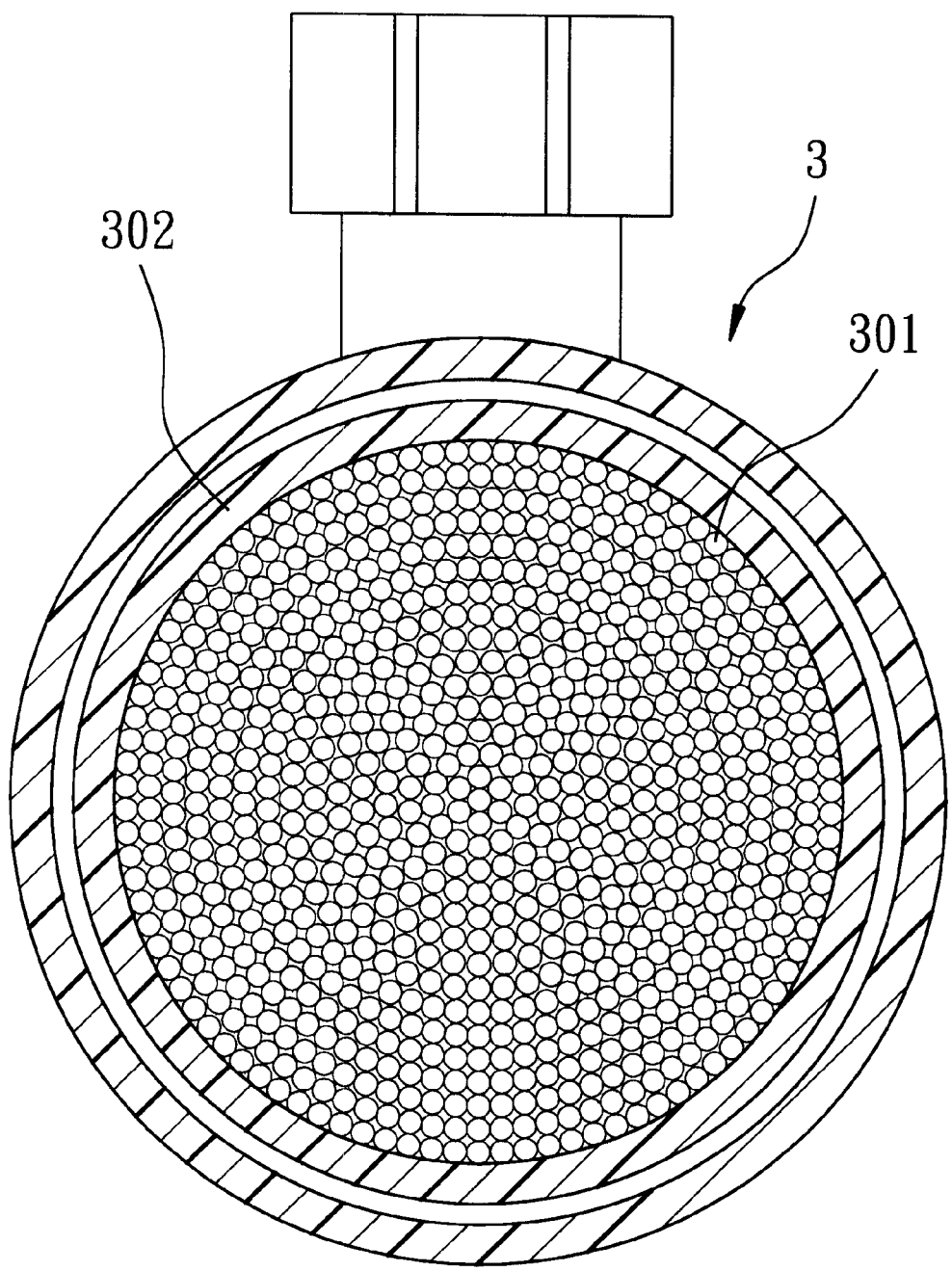
FIG. 4 is a sectional view of a third conventional water filter.
Figure 5:
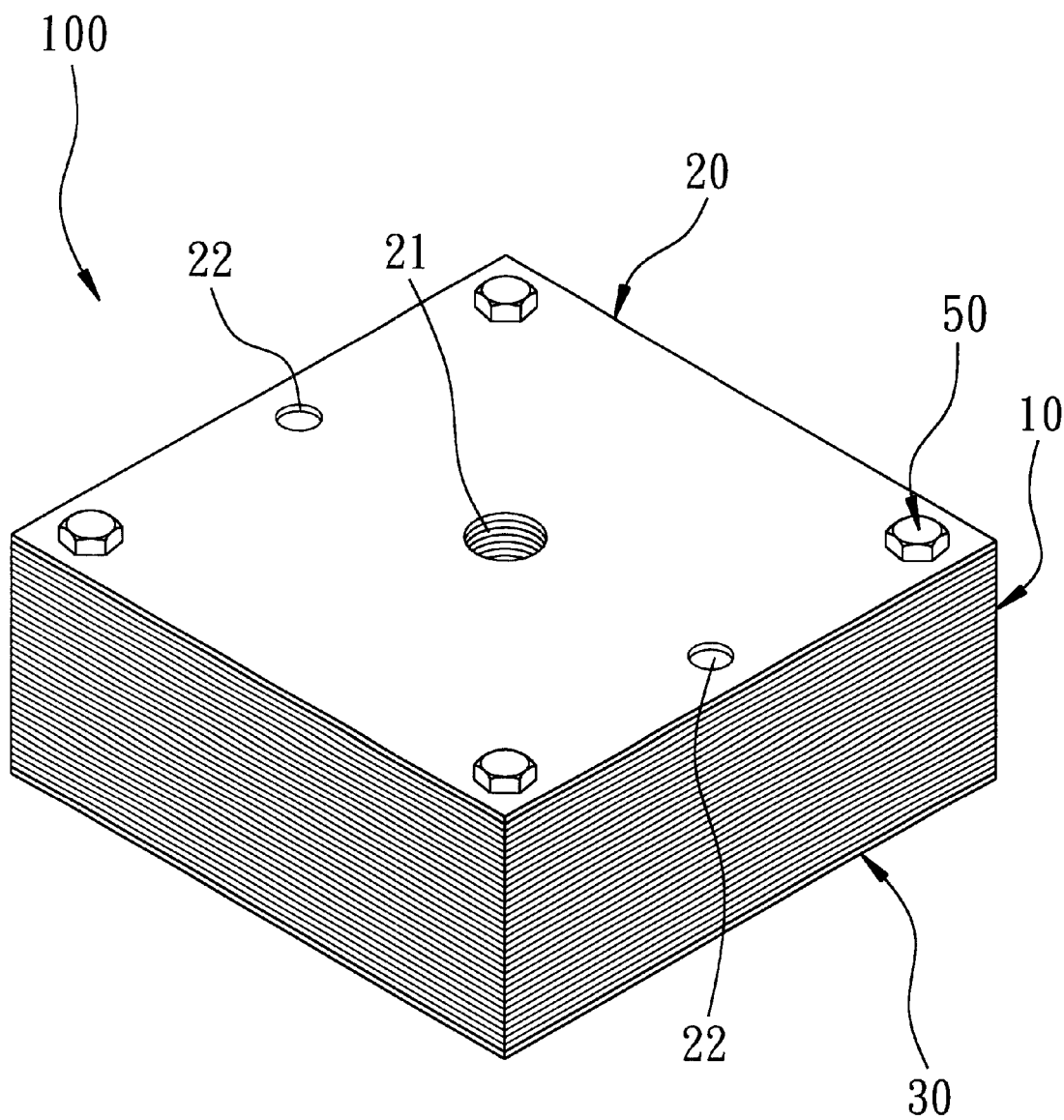
FIG. 5 is an assembled perspective view of the preferred embodiment of a laminated modular water filter according to this invention.
Figure 6:
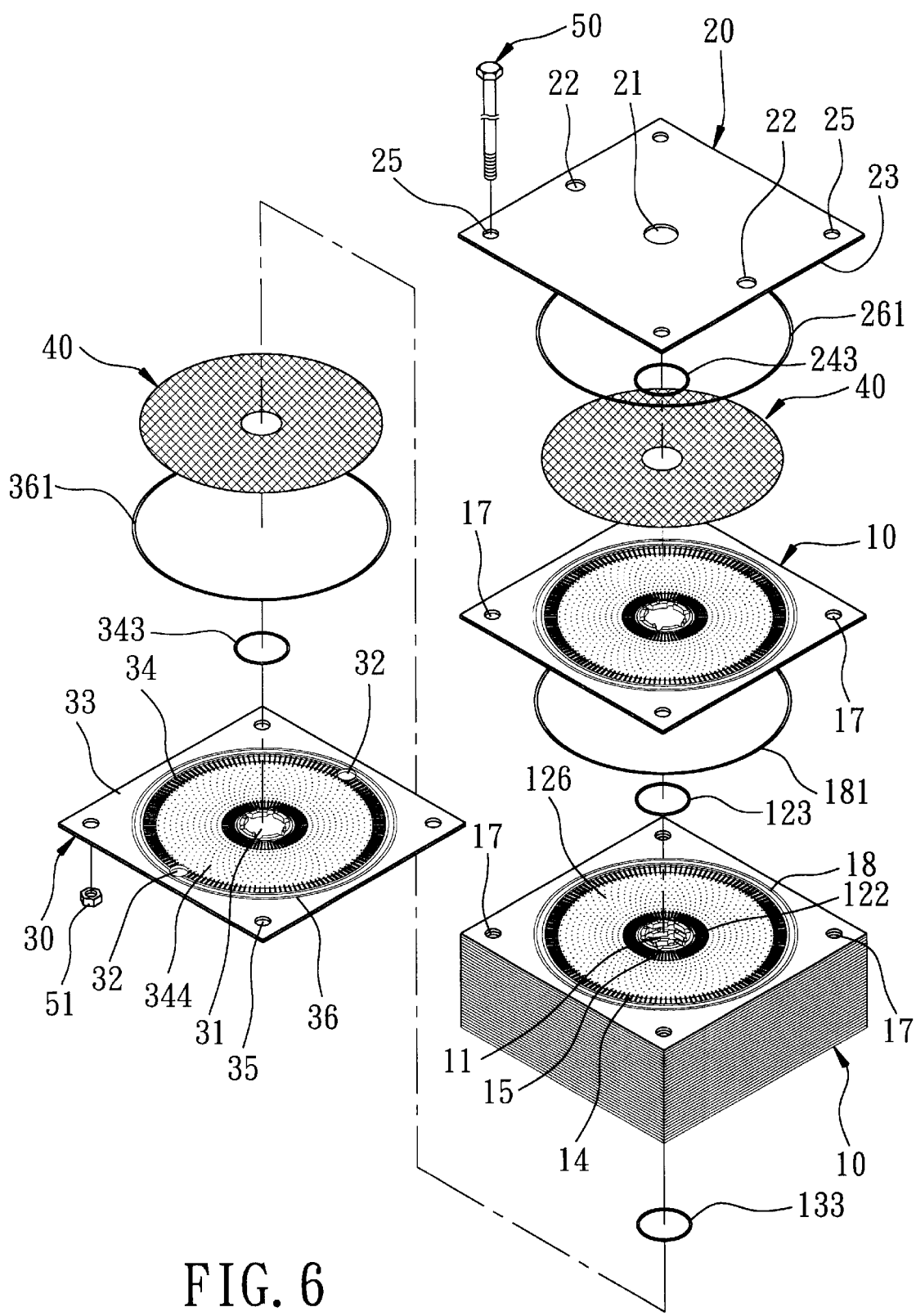
FIG. 6 is an exploded perspective view of the preferred embodiment.
Figure 9:
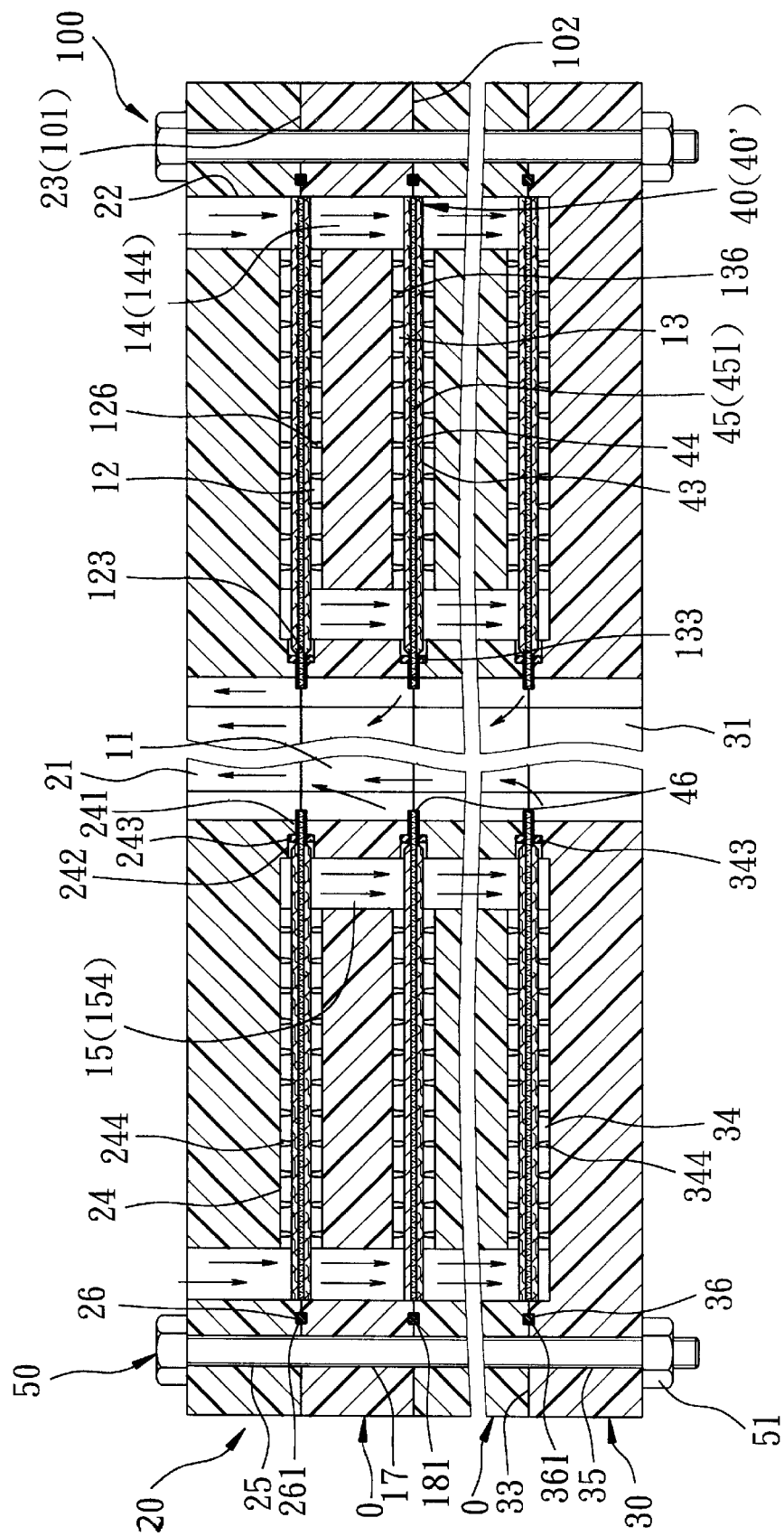
FIG. 9 is a sectional view of the preferred embodiment, illustrating the flow path of the water to be filtered.

Referring to FIGS. 5 and 6, the preferred embodiment of a laminated modular water filter 100 according to this invention is shown to include a plurality of superposed intermediate plates 10, a top plate 20, a bottom plate 30, a plurality of laminated filter units 40 and four lock bolts 50 (only one is shown in FIG. 6). The top plate 20 is superposed on the uppermost intermediate plate 10. The lowermost intermediate plate 10 is superposed on the bottom plate 30. Each of the intermediate, top and bottom plates 10, 20, 30 is made of rubber, and has a central hole 11, 21, 31, and four fastener holes 17, 25, 35. The central holes 11, 21, 31 in the intermediate, top and bottom plates 10, 20, 30 are in fluid communication with each other, as shown in FIG. 9. The bolts 50 extend respectively through the fastener holes 17, 25, 35 in each of the intermediate, top and bottom plates 10, 20, 30, and engage respectively four nuts 51 (only one is shown in FIG. 6), thereby interconnecting the intermediate, top and bottom plates 10, 20, 30 removably.

Figure 7:
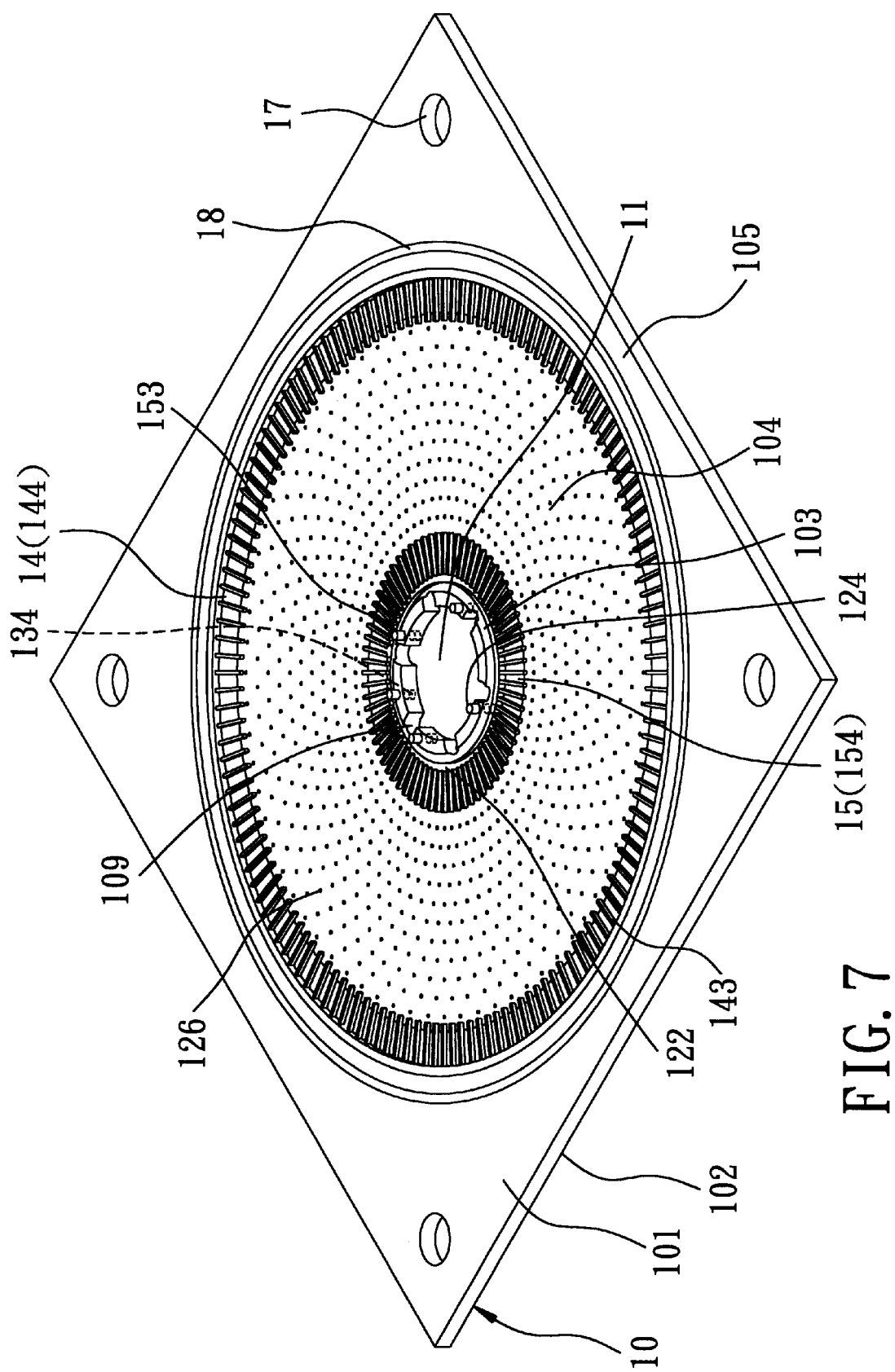
FIG. 7 is a perspective view of an intermediate plate of the preferred embodiment.
Figure 8:
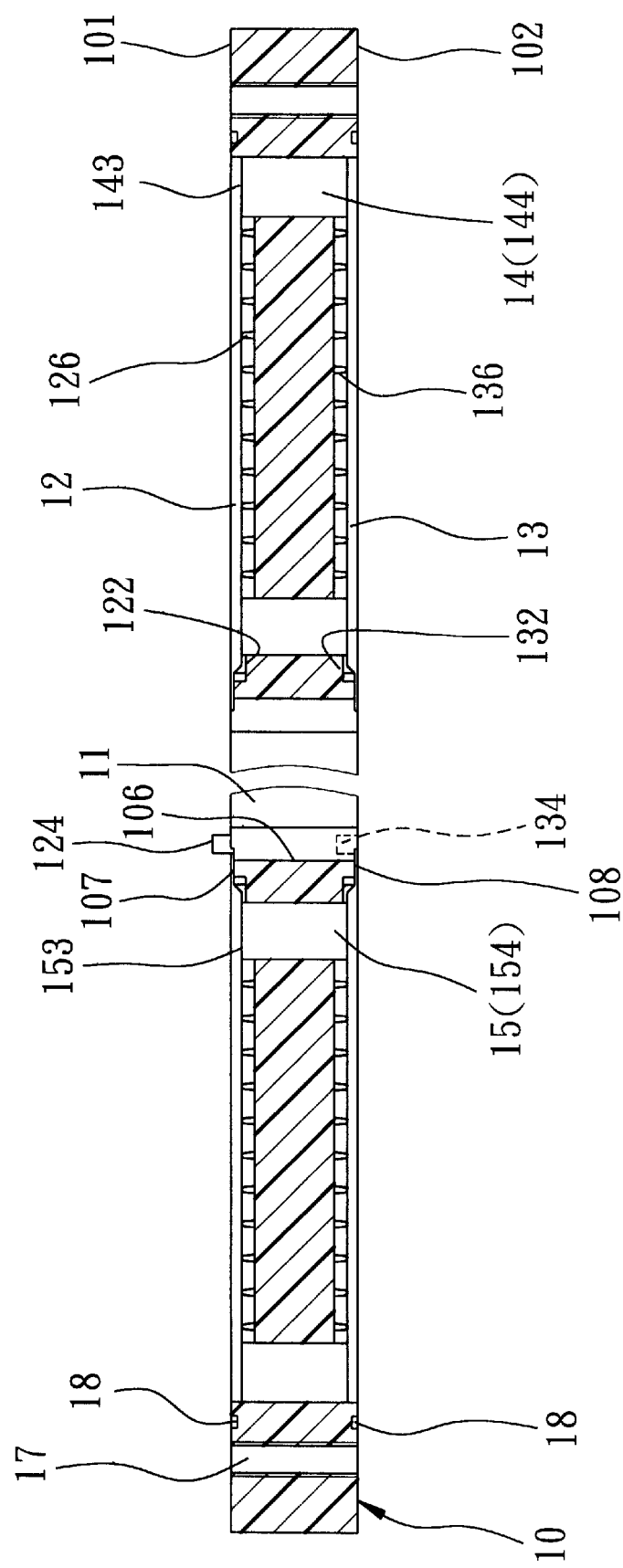
FIG. 8 is a sectional view of the intermediate plate of the preferred embodiment.

The intermediate plates 10 are arranged one above another. As best shown in FIGS. 7 and 8, each of the intermediate plates 10 includes a top surface 101 with an annular upper groove 12, a bottom surface 102 with an annular lower groove 13, an annular outer passage unit 14 and an annular inner passage unit 15. Each of the outer passage units 14 is formed through the respective intermediate plate 10, and has an upper end that is in fluid communication with an outer peripheral portion of the corresponding upper groove 12, and a lower end that is in fluid communication with an outer peripheral portion of the corresponding lower groove 13. Each of the inner passage units 15 is formed through the respective intermediate plate 10, and has an upper end that is in fluid communication with an inner peripheral portion of the corresponding upper groove 12, and a lower end that is in fluid communication with an inner peripheral portion of the corresponding lower groove 13.

Referring to FIGS. 6 and 9, the top plate 20 has two side openings 22 that are located on two sides of the central hole 21 and that are in fluid communication with the outer passage units 14 in the intermediate plates 10, and a bottom surface 23 with an annular lower groove 24.

The bottom plate 30 has two side openings 32 that are located on two sides of the central hole 31 and that are in fluid communication with the outer passage units 14 in the intermediate plates 10, and a top surface 33 with an annular upper groove 34.

The upper grooves 12, 34 in the intermediate and bottom plates 10, 30 are aligned with the lower grooves 13, 24 in the intermediate and top plates 10, 20. Each adjacent pair of the intermediate, top and bottom plates 10, 20, 30 define an annular accommodating space 40' therebetween, which is formed cooperatively from the respective upper groove 12, 34 and the respective lower groove 13, 24 so as to receive the respective filter unit 40 fittingly therein.

Each of the top and bottom surfaces 101, 102 of the intermediate plates 10, the bottom surface 23 of the top plate 20, and the top surface 33 of the bottom plate 30 is formed with an annular slot 18, 26, 36. Each adjacent pair of the intermediate, top and bottom plates 10, 20, 30 clamp an O-ring 181, 261, 361 therebetween, which is received within the corresponding slots 18, 26, 36 so as to establish a liquid-tight seal around the corresponding filter unit 40. Each of the filter units 40 includes two annular filter films 43, 44 that are received fittingly within the corresponding accommodating space 40' and that are interconnected fixedly along outer peripheral portions thereof, and a filter net 45 that is sandwiched between the filter films 43, 44 so as to define an annular filtered-water passage 451 between the filter films 43, 44. The filtered-water passages 451 have inner peripheries that are in fluid communication with the central holes 11, 21, 31 in the intermediate, top and bottom plates 10, 20, 30. Each of the upper and lower grooves 12, 13, 24, 34 is provided with a seal ring 123, 133, 243, 343 that is disposed in an inner periphery thereof, that abuts against an inner periphery of the respective filter film 43, 44, and that is disposed between the corresponding filter film 43, 44 and a corresponding one of the intermediate, top and bottom plates 10, 20, 30. The upper grooves 12, 34 in the intermediate and bottom plates 10, 30 are aligned with the lower grooves 13, 24 in the intermediate and top plates 10, 20.

When it is desired to filter dirty water, the central hole 31 and the openings 32 in the bottom plate 30 are closed. Subsequently, dirty water is forced into the openings 22 in the top plate 20, e.g. by means of a pump (not shown), so as to flow into the outer passage units 14 in the intermediate plates 10. Because the inner passage units 15 are in fluid communication with the outer passage units 14 via the upper and lower grooves 12, 13, the dirty water flows from the upper and lower grooves 12, 13 and the outer and inner passage units 14, 15 into the filtered-water passages 451, thereby forming filtered water, i.e. potable pure water. The filtered water is forced from the filtered-water passages 451 into the central holes 11, 21, 31 in the intermediate, top and bottom plates 10, 20, 30, thereby flowing from the water filter 100 through the central hole 21 in the top plate 20.

The water filter 100 can be cleaned by three methods, i.e. a forward washing method, a reverse washing method and a dismount washing method.

Figure 10:
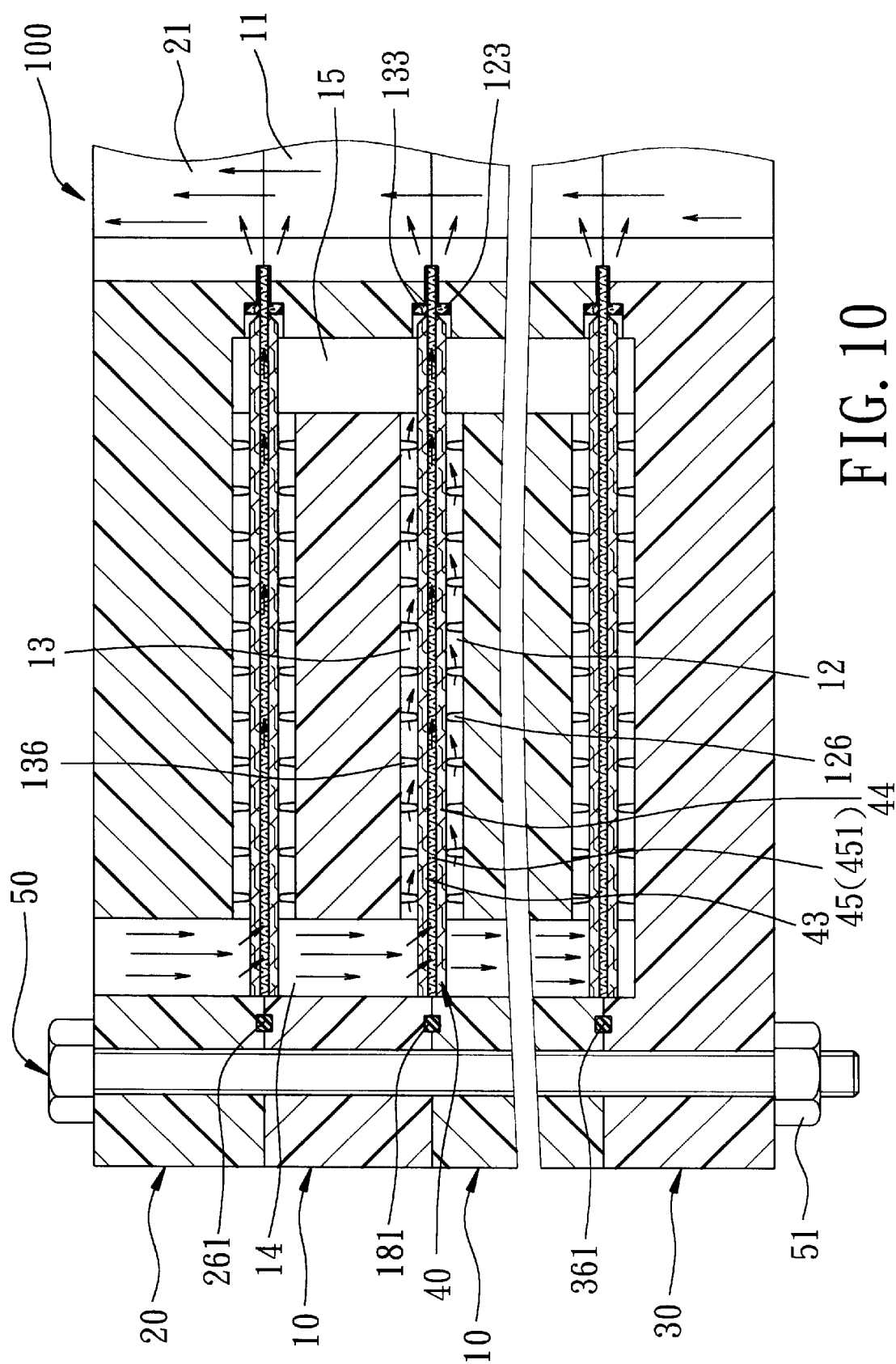
FIG. 10 is a sectional view of the preferred embodiment, illustrating how washing water is forced to flow along forward washing paths in order to wash a plurality of filter units.

Referring to FIG. 10, the forward washing method includes the following steps:

(1) closing the central holes 21, 31 in the top and bottom plates 20, 30; and (2) forcing washing water into the openings 22 in the top plate 20 so as to seep through the filter films 43, 44 in a first direction, thereby flowing into the filtered-water passages 451 along forward washing paths indicated by the arrowheads (shown in solid lines in FIGS. 10 and 11), and subsequently flowing from the water filter 100 through the openings 32 (see FIG. 6) in the bottom plate 30.

Figure 11:
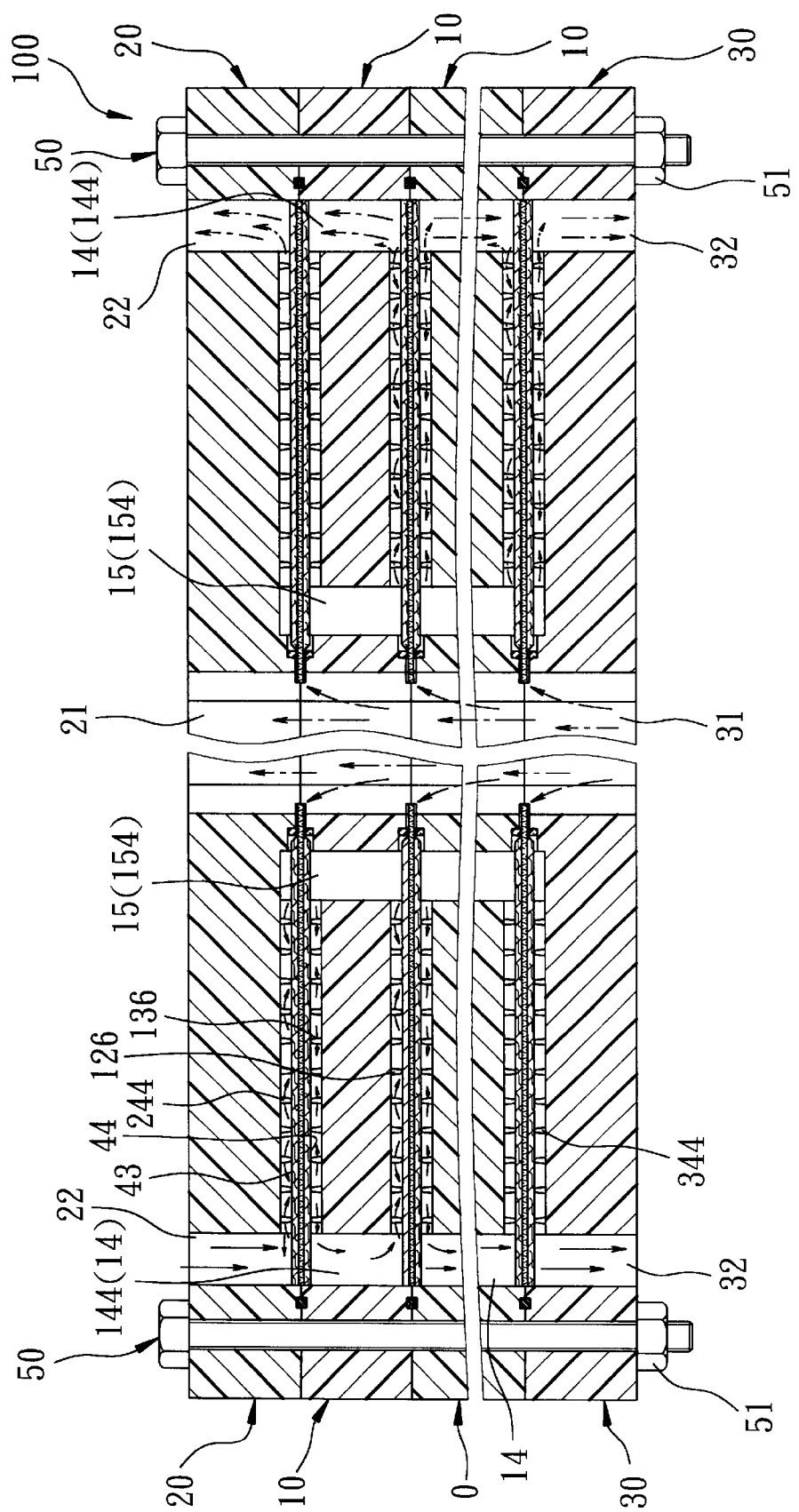
FIG. 11 is a sectional view of the preferred embodiment, illustrating how washing water is forced to flow along reverse washing paths indicated by the phantom lines in order to wash the filter units.

Referring to FIG. 11, the reverse washing method includes the following steps:

(1) closing the central hole 21 in the top plates 20; and (2) forcing washing water into the opening 32 in the bottom plate 30 so as to seep through the filter films 43, 44 in a second direction that is opposite to the first direction, thereby flowing from the filtered-water passages 451 into the outer passage units 14 along reverse washing paths indicated by the arrowheads (shown in phantom lines), and subsequently flowing from the water filter 100 through the openings 22, 32 in the top and bottom plate 20, 30.

Because the second direction is opposite to the first direction, the water filter 100 can be cleaned effectively by both the forward washing method and the reverse washing method.

The dismount washing method includes the following steps:

(1) removing the bolts 50 from the nuts 51;
(2) removing each of the filter units 40 from the intermediate, top and bottom plates 10, 20, 30; and
(3) washing the filter units 40 individually.

Referring once again to FIGS. 7 and 8, each of the intermediate plates 10 includes an annular inner plate portion 103, an annular intermediate plate portion 104, an annular outer plate portion 105, a plurality of angularly equidistant, vertical outer plates 143, and a plurality of angularly equidistant, vertical inner plates 153. Each of the inner plate portions 103 defines the central hole 11 in the respective intermediate plate 10. Each of the intermediate plate portions 104 is disposed around the respective inner plate portion 103. Each of the outer plate portions 105 is disposed around the respective intermediate plate portion 104. The outer plates 143 extend integrally and radially between the intermediate and outer plate portions 104, 105. The inner plates 153 extend integrally and radially between the inner and intermediate plate portions 103, 104. Each adjacent pair of the outer plates 143 define a radial outer passage 144 therebetween. The outer passages 144 cooperatively constitute the outer passage unit 14. Each adjacent pair of the inner plates 153 define a radial inner passage 154 therebetween. The inner passages 154 cooperatively constitute the inner passage unit 15. The filter units 40 have outer peripheral portions that are clamped between the outer plates 143, and inner peripheral portions that are clamped between the inner plates 153.

Each of the inner plate portions 103 is formed with a plurality of integral flanges 106 that are spaced circumferentially apart from each other, and two annular slots 122, 132 that are formed respectively in top and bottom surfaces of the respective inner plate portion 103 between the flanges 106 and the inner plates 153 and that are in fluid communication with the corresponding inner passage unit 15. Each of the slots 122, 132 receives an intermediate seal ring 123, 133 and the inner periphery of the corresponding filter unit 40 therein. Likewise, an upper seal ring 243 is disposed between the top plate 20 and the uppermost intermediate plate 10, while a lower seal ring 343 is disposed between the lowermost intermediate plate 10 and the bottom plate 30. The inner periphery of each of the filter units 40 is clamped between the corresponding two seal rings 123, 133, 243, 343, as shown in FIG. 9.

Each of the flanges 106 has flat top and bottom surfaces 107, 108. The flanges 106 of each adjacent pair of the intermediate plates 10 abut against each other by engaging the corresponding top surface 107 and the corresponding bottom surface 108. Each adjacent pair of the flanges 106 define a space 109 therebetween, which is in fluid communication with the corresponding central hole 11 and the annular slots 122, 132.

Referring once again to FIGS. 6 and 9, each of the intermediate and bottom plates 10, 30 is formed integrally with a plurality of upper posts 126, 344 that extend upwardly therefrom and that are disposed within the corresponding upper grooves 12, 34 so as to press against a bottom surface of the corresponding filter unit 40, thereby forming a turbulent water flow around each of the upper posts 126, 344. Each of the intermediate and top plates 10, 20 is formed integrally with a plurality of lower posts 136, 244 that extend downwardly therefrom and that are disposed within the corresponding lower grooves 13, 24 so as to press against a top surface of the corresponding filter unit 40, thereby forming a turbulent water flow around each of the lower posts 136, 244.

Each adjacent pair of the intermediate, top and bottom plates 10, 20, 30 are positioned relative to each other by engaging a plurality of positioning posts 124 (see FIGS. 7 and 8), which are formed on the top surface of a corresponding one of the intermediate and bottom plates 10, 30, with a plurality of positioning holes 134 (see FIGS. 7 and 8), which are formed in the bottom surface of a corresponding one of the intermediate and top plates 10, 20.

Because the intermediate plates 10 can be easily removed from and mounted to the remaining parts of the water filter 100, when the water to be processed is comparatively dirty, the number of the intermediate plates 10, the intermediate seal rings 123, 133, the O-rings 181 and the filter units 40 can be increased accordingly.

With this invention thus explained, it is apparent that numerous modifications and variations can be made without departing from the scope and spirit of this invention. It is therefore intended that this invention be limited only as indicated by the appended claims.

I claim:

1. A water filter for filtering dirty water, which has a plurality of suspended solid particles, said water filter comprising:

a plurality of superposed annular intermediate plates arranged one above another, each of said intermediate plates including
a top surface with an annular upper groove,
a bottom surface with an annular lower groove,
a central hole formed through a respective one of said intermediate plates, said central holes in each adjacent pair of said intermediate plates being aligned with and being in fluid communication with each other, and
an annular outer passage unit formed through the respective one of said intermediate plates and having an upper end that is in fluid communication with an outer peripheral portion of said upper groove in the respective one of said intermediate plates, and a lower end that is in fluid communication with an outer peripheral portion of said lower groove in the respective one of said intermediate plates, said outer passage units in each adjacent pair of said intermediate plates being aligned with and being in fluid communication with each other;

an annular top plate superposed on an uppermost one of said intermediate plates and having
a bottom surface with an annular lower groove that is aligned with said upper and lower grooves in said intermediate plates,
a central hole formed through said top plate and in fluid communication with said central holes in said intermediate plates, and
two side openings aligned with and in fluid communication with said outer passage unit in the uppermost one of said intermediate plates;

an annular bottom plate, on which a lowermost one of said intermediate plates is superposed, said bottom plate having
- a top surface with an annular upper groove that is aligned with said upper and lower grooves in said intermediate plates, each adjacent pair of said top, intermediate and bottom plates defining an annular accommodating space therebetween, which is formed cooperatively from a respective one of said upper grooves in said intermediate and bottom plates and a respective one of said lower grooves in said top and intermediate plates and which is in fluid communication with said central holes in said intermediate plates,
- a central hole formed through said bottom plate and in fluid communication with said central holes in said intermediate plates, and
- two side openings aligned with and in fluid communication with said outer passage unit in the lowermost one of said intermediate plates;

a plurality of laminated filter units disposed respectively within a respective one of said accommodating spaces, each of said filter units including two annular filter films that are received fittingly within the respective one of said accommodating spaces and that are interconnected fixedly along outer peripheral portions thereof, and an annular filter net that is sandwiched between said filter films so as to define an annular filtered-water passage between said filter films, thereby preventing flow of the solid particles into said filtered-water passage via said filter films, said filtered-water passages having inner peripheries that are in fluid communication with said central holes in said intermediate plates so as to permit water flow between said central holes in said intermediate plates and said filtered-water passages, the dirty water being capable of being forced into said openings in said top plate when said central hole and said openings in said bottom plate are closed such that the dirty water flows into said filtered-water passages along a flow path of said outer passage units in said intermediate plates, said upper and lower grooves in said top, intermediate and bottom plates and said filter films, thereby forming filtered water, which in turn flows from said water filter through said central hole in said top plate; and means for connecting said intermediate plates removably to said top and bottom plates;

whereby, after the solid particles are deposited on said filter films and when said central holes in said top and bottom plates are closed, washing water can be forced into said openings in said top plate so as to flow from said water filter through said openings in said bottom plate, thereby removing the solid particles from said filter films; and whereby, after the solid particles are deposited on said filter films and when said central hole in said top plate is closed, washing water can be forced into said central hole in said bottom plate so as to flow from said water filter through said openings in said top and bottom plates, thereby removing the solid particles from said filter films.

2. The water filter as claimed in claim 1, wherein each of said intermediate plates further includes an annular inner passage unit that is formed through the respective one of said intermediate plates and that includes:
- an upper end in fluid communication with an inner peripheral portion of said upper groove in the respective one of said intermediate plates;
- a lower end in fluid communication with an inner peripheral portion of said lower groove in the respective one of said intermediate plates; and
- an inner periphery in fluid communication with said central hole in the respective one of said intermediate plates via the respective filter unit, said inner passage units in each adjacent pair of said intermediate plates being aligned with and being in fluid communication with each other.

3. The water filter as claimed in claim 2, wherein each of said filter units has an inner peripheral portion and an outer peripheral portion, each of said intermediate plates being made of rubber, and including:
- an annular inner plate portion defining said central hole in the respective one of said intermediate plates therein;
- an annular intermediate plate portion disposed around said inner plate portion;
- an annular outer plate portion disposed around said intermediate plate portion;
- a plurality of angularly equidistant, vertical inner plates extending integrally and radially between said inner and intermediate plate portions, each adjacent pair of said inner plates defining a radial inner passage therebetween, said radial inner passages cooperatively constituting a corresponding one of said inner passage units, said inner plates of each adjacent pair of said intermediate plates clamping said inner peripheral portion of a respective one of said filter units therebetween; and
- a plurality of angularly equidistant, vertical outer plates extending integrally and radially between said intermediate and outer plate portions, each adjacent pair of said outer plates defining a radial outer passage therebetween, said radial outer passages cooperatively constituting a corresponding one of said outer passage units, said outer plates of each adjacent pair of said intermediate plates clamping said outer peripheral portion of the respective one of said filter units therebetween.

* * * * *